United States Patent
Porter et al.

(10) Patent No.: US 11,783,384 B2
(45) Date of Patent: Oct. 10, 2023

(54) COMPUTER VISION SYSTEMS AND METHODS FOR AUTOMATICALLY DETECTING, CLASSIFYING, AND PRICING OBJECTS CAPTURED IN IMAGES OR VIDEOS

(71) Applicant: Insurance Services Office, Inc., Jersey City, NJ (US)

(72) Inventors: Bryce Zachary Porter, Lehi, UT (US); Dean Lebaron, Pleasant Grove, UT (US)

(73) Assignee: Insurance Services Office, Inc., Jersey City, NJ (US)

( * ) Notice: Subject to any disclaimer, the term of this patent is extended or adjusted under 35 U.S.C. 154(b) by 100 days.

(21) Appl. No.: 16/458,827

(22) Filed: Jul. 1, 2019

(65) Prior Publication Data

US 2020/0005075 A1 Jan. 2, 2020

Related U.S. Application Data

(60) Provisional application No. 62/691,777, filed on Jun. 29, 2018.

(51) Int. Cl.
*G06Q 30/02* (2023.01)
*G06V 20/40* (2022.01)
(Continued)

(52) U.S. Cl.
CPC ......... *G06Q 30/0278* (2013.01); *G06F 18/24* (2023.01); *G06V 10/25* (2022.01);
(Continued)

(58) Field of Classification Search
CPC .... G06K 9/00785; G06K 9/4652; G06K 9/48; G06K 9/6267; G06K 9/00771;
(Continued)

(56) References Cited

U.S. PATENT DOCUMENTS

| | | | |
|---|---|---|---|
| 9,996,890 B1 | 6/2018 | Cinnamon et al. | |
| 2006/0080265 A1* | 4/2006 | Hinds | G06Q 30/0283 705/400 |

(Continued)

FOREIGN PATENT DOCUMENTS

CN 107833213 A 3/2018

OTHER PUBLICATIONS

International Search Report of the International Searching Authority dated Sep. 20, 2019, issued in connection with International Application No. PCT/US2019/40106 (3 pages).
(Continued)

*Primary Examiner* — Ajibola A Akinyemi
(74) *Attorney, Agent, or Firm* — McCarter & English, LLP (57) ABSTRACT

A system and method for automatically detecting, classifying, and processing objects captured in an image. The system receives an image from the image source and detects one or more objects in the image. The system then performs a high-level classification of each of the one or more objects in the image and extracts each of the one or more objects from the image. The system then performs a specific classification of each of the one or more objects and determines a price of each of the one or more objects. Finally, the system generates a pricing report comprising a price of each of the one or more objects.

34 Claims, 12 Drawing Sheets

(51) Int. Cl.
   *G06F 18/24*    (2023.01)
   *G06V 10/25*    (2022.01)
   *G06V 10/764*   (2022.01)
   *G06V 10/82*    (2022.01)
   *G06V 20/10*    (2022.01)

(52) U.S. Cl.
   CPC ............ *G06V 10/764* (2022.01); *G06V 10/82* (2022.01); *G06V 20/10* (2022.01); *G06V 20/41* (2022.01); *G06V 20/46* (2022.01)

(58) Field of Classification Search
   CPC ............ G06K 9/4609; G06K 9/00765; G06K 9/6212; G06K 9/00718; G06K 9/00744; G06K 9/4642; G06K 9/00362; G06K 9/00805; G06K 9/3233; G06K 9/6256; G06K 9/66; G06K 2209/01; G06K 2209/19; G06K 9/00664; G06K 9/4671
   USPC .......................................................... 382/190
   See application file for complete search history.

(56) References Cited

U.S. PATENT DOCUMENTS

| | | | |
|---|---|---|---|
| 2006/0235875 A1* | 10/2006 | Wen | G06F 16/951 |
| 2015/0248589 A1* | 9/2015 | Broache | G06F 18/22 |
| | | | 382/182 |
| 2016/0086029 A1 | 3/2016 | Dubuque | |
| 2016/0140424 A1 | 5/2016 | Wang et al. | |
| 2016/0171622 A1 | 6/2016 | Perkins et al. | |
| 2016/0342863 A1 | 11/2016 | Kwon et al. | |
| 2016/0358632 A1 | 12/2016 | Lakhani et al. | |
| 2017/0132686 A1 | 5/2017 | Kim et al. | |
| 2017/0177969 A1* | 6/2017 | Zaremski | G06V 20/52 |
| 2017/0331937 A1 | 11/2017 | Tsao | |
| 2018/0114087 A1* | 4/2018 | Kamen | G06T 7/0012 |
| 2019/0258876 A1* | 8/2019 | Liu | G06V 20/58 |
| 2021/0201039 A1 | 7/2021 | Frei et al. | |

OTHER PUBLICATIONS

Written Opinion of the International Searching Authority dated Sep. 20, 2019, issued in connection with International Application No. PCT/US2019/40106 (7 pages).

Fang, et al., "Fine-Grained Vehicle Model Recognition Using a Course-to-Fine Convolutional Neural Network Architecture," IEEE Transactions on Intelligent Transportation Systems, vol. 18, No. 7, Jul. 2017 (11 pages).

HomeZada Home Inventory Videos and Inventory Recognition AI, Nov. 29, 2018, retrieved from https://www.youtube.com/watch?v=zn3g39ydnpo (1 page).

Bell, et al., "Learning Visual Similarity for Product Design with Convolutional Neural Networks," ACM Transactions on Graphics, vol. 34, No. 45, Article 98, Aug. 2015 (10 pages).

Extended European Search Reported dated Jul. 15, 2021, issued by the European Patent Office issued in connection with European Application No. 19826155.4 (9 pages).

Office Action dated Jun. 7, 2022, issued in connection with U.S. Appl. No. 17/162,755 (8 pages).

International Search Report of the International Searching Authority dated Apr. 12, 2022, issued in connection with International Application No. PCT/US2022/14207 (3 pages).

Written Opinion of the International Searching Authority dated Apr. 12, 2022, issued in connection with International Application No. PCT/US2022/14207 (6 pages).

Notice of Allowance dated Dec. 27, 2022, issued in connection with U.S. Appl. No. 17/162,755 (8 pages).

* cited by examiner

Generic Insurance Company Inc

Pricing Estimate

Propriet 123 W 500 5, Someplace, USA

Date: 1/1/2018
John Doe

| Quantity | Item | | Confidence | Best Price | Unit Total |
|---|---|---|---|---|---|
| 1 |  | Digby Conversation Model | 8 | 250 | 250.00 |
| 1 |  | Ashley Pinewood Dining Table | 66 | 800 | 800.00 |
| 1 |  | Panasonic 20" Picture Tube TV | 85 | 50 | 50.00 |
| 2 |  | Basset Alex Fabric Chair | .50 | 310 | 620.00 |
| | | | | Subtotal | $1670.00 |
| | | | | Sales Tax | $116.90 |
| | | | | Total | $1786.90 |

COMPUTER VISION SYSTEMS AND METHODS FOR AUTOMATICALLY DETECTING, CLASSIFYING, AND PRICING OBJECTS CAPTURED IN IMAGES OR VIDEOS

RELATED APPLICATION

This application is a continuation application of and claims priority to U.S. Provisional Patent Application No. 62/691,777 filed on Jun. 29, 2018, the entire disclosure of which is expressly incorporated herein by reference.

BACKGROUND

Technical Field

The present disclosure relates generally to the field of computer vision. More specifically, the present disclosure relates to computer visions systems and methods for automatically detecting, classifying, and pricing objects captured in images or videos.

Related Art

Accurate and rapid identification and depiction of objects from digital images (e.g., aerial images, smartphone images, etc.) and video data is increasingly important for a variety of applications. For example, information related to properties and structures thereon (e.g., buildings) is often used by insurance adjusters to determine the proper costs for insuring homes and apartments. Further, in the home remodeling industry, accurate information about personal property can be used to determine the costs associated with furnishing a dwelling.

Various software systems have been developed for processing images to identify objects in the images. Computer visions systems, such as convolutional neural networks, can be trained to detect and identify different kinds of objects. For example, key point detectors may yield numerous key point candidates that must be matched against other key point candidates from different images.

Currently, professionals such as insurance adjusters need to manually determine or "guesstimate" the value of a person's possessions. This is a time-consuming and mistake-ridden process that could lead to inaccurate insurance estimates. As such, the ability to quickly detect objects in a location and determine their value is a powerful tool for insurance and other professionals. Accordingly, the computer vision systems and methods disclosed herein solve these and other needs by providing a robust object detection, classification, and identification system.

SUMMARY

The present disclosure relates to computer vision systems and methods for automatically detecting, classifying, and pricing objects captured in images or videos. The system first receives one or more images or video data. For example, the images or video data can be received from an insurance adjuster taking photos and/or videos using a smartphone. The system then detects and classifies the objects in the images and/or video data. The detecting and classifying steps can be performed by the system using a convolutional neural network. Next, the system extracts the objects from the images or video data. The system then classifies each of the detected objects. For example, the system compares the detected objects to images in a database in order to classify the objects. Next, the system determines the price of the detected object. Lastly, the system generates a pricing report. The pricing report can include the detected and classified objects, as well as a price for each object.

BRIEF DESCRIPTION OF THE DRAWINGS

The foregoing features of the invention will be apparent from the following Detailed Description of the Invention, taken in connection with the accompanying drawings, in which.

DETAILED DESCRIPTION

The present disclosure relates to computer vision systems and methods for automatically detecting, classifying, and pricing objects captured in images or video, as described in detail below in connection with FIGS. 1-12.

Figure 1:
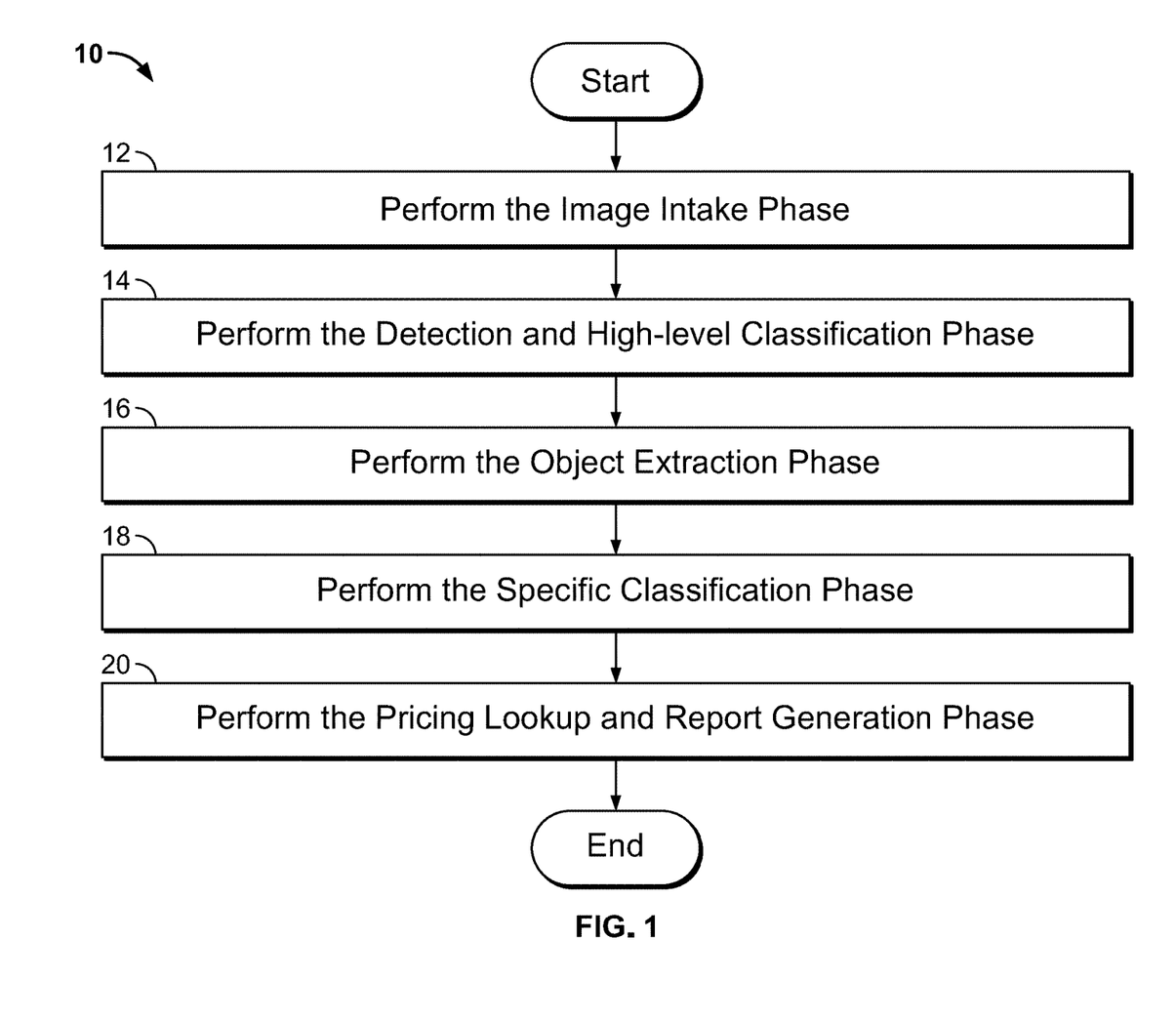
FIG. 1 is a flowchart illustrating overall process steps carried out by the system of the present disclosure.

FIG. 1 is a flowchart illustrating the overall process steps carried out by the system, indicated generally at 10. In step 12, the system performs an image intake phase. During the image intake phase, the system receives an input of one or more images, and/or video data. The one or more images and/or video data can relate to a single project or multiple projects. In a first example, a user, such as an insurance adjuster performing an on-site estimate, can take several photos (e.g., images) and/or video of an area with a mobile phone, a tablet, etc. The user can then upload the photos and/or video into the system for processing. The processing, which will be described in greater detail below, generates a pricing report, which can include an interactive pricing estimate of the objects detected in the photo(s) and/or video.

In step 14, the system performs a detection and high level classification phase. Specifically, the system detects and classifies one or more objects in the image (or a video frame). By way of example, the system can detect and classify the objects in the image or video using a convolutional neural network ("CNN"), such as a single shot detector ("SSD") network. The CNN can process the image (or the video frame) and apply a bounding box to one or more objects detected in the image (or the video frame). Each object detected can be labeled. For example, if the image contains a desk, a chair and a radio, the CNN can detect and label the desk, the chair and the radio.

It should be understood that the process of step 14 can be applied to each image and to any video data received during the image intake phase. Regarding the video data, the system can sample the video data and extract frames. For example, the system can use a sampling rate such that every third frame is exacted from the video data and processed. Those skilled in the art would understand that other methods and systems to detect and classify the objects can be used during the detection and high-level classification phase, such as, but not limited to, further CNN types.

In step 16, the system performs an object extraction phase. Specifically, the system, extracts one or more detected object from the image(s). In step 18, the system performs a specific classification phase. Specifically, the system determines a specific make, model, etc. of the extracted object(s). In step 20, the system performs a pricing lookup and report generation phase. Specifically, the system determines the price of the extracted object(s) and generates a pricing report for the user. Steps 14-20 will be explained in greater detail below.

Figure 2:
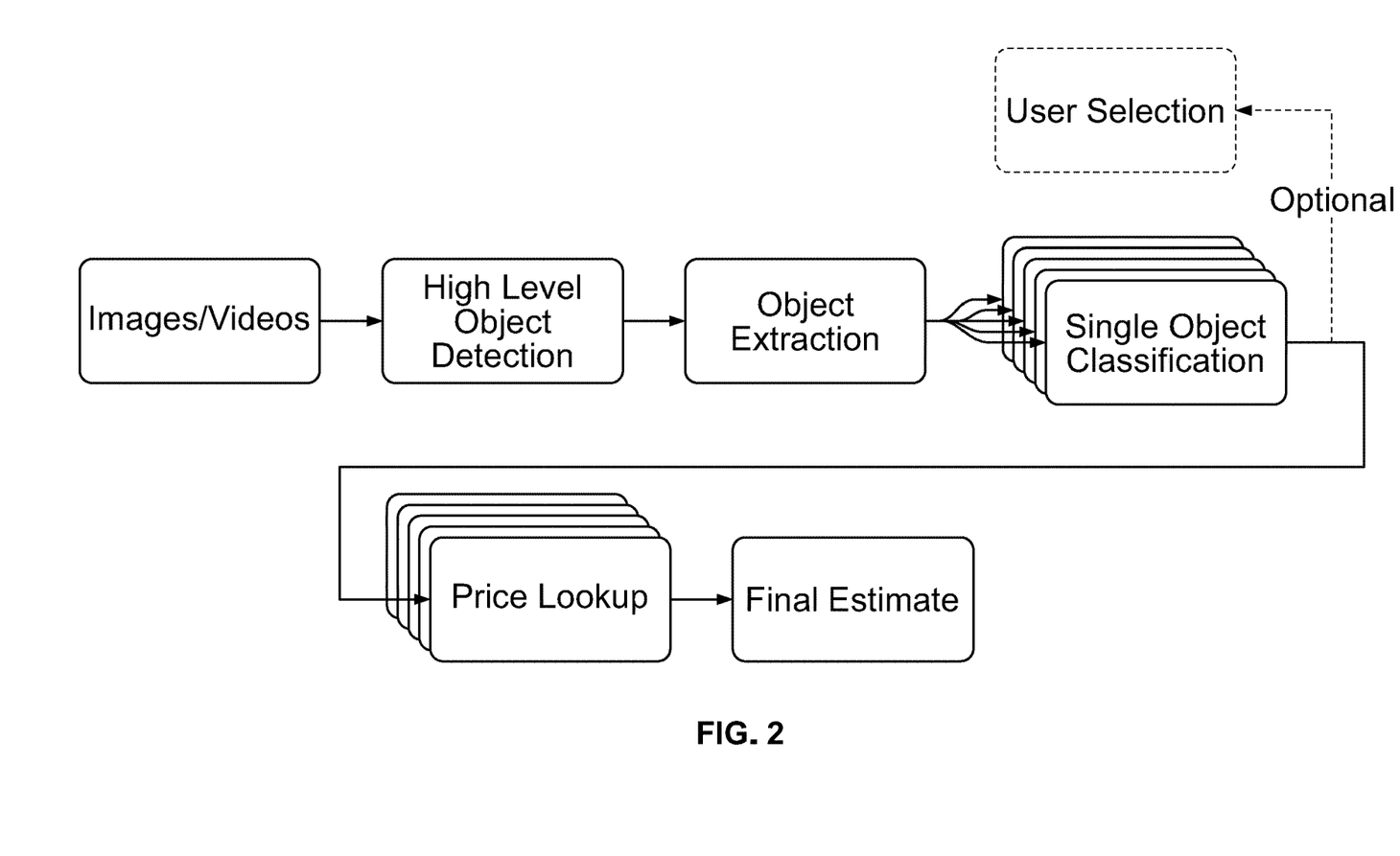
FIG. 2 is a diagram illustrating the processing steps of FIG. 1.

FIG. 2 is a diagram illustrating the processing steps discussed in connection with FIG. 1. As can be seen, multiple object classification processes can be executed in parallel, in order to speed up detection and classification of objects in images/videos by the system. Also, as can be seen, the user can, optionally, manually select one or more objects in the images/videos for classification and/or price lookup. The process steps of the invention disclosed herein could be embodied as computer-readable software code executed by one or more computer systems, and could be programmed using any suitable programming languages including, but not limited to, C, C++, C#, Java, Python or any other suitable language. Additionally, the computer system(s) on which the present disclosure can be embodied includes, but is not limited to, one or more personal computers, servers, mobile devices, cloud-based computing platforms, etc., each having one or more suitably powerful microprocessors and associated operating system(s) such as Linux, UNIX, Microsoft Windows, MacOS, etc. Still further, the invention could be embodied as a customized hardware component such as a field-programmable gate array ("FPGA"), application-specific integrated circuit ("ASIC"), embedded system, or other customized hardware component without departing from the spirit or scope of the present disclosure.

Figure 3:
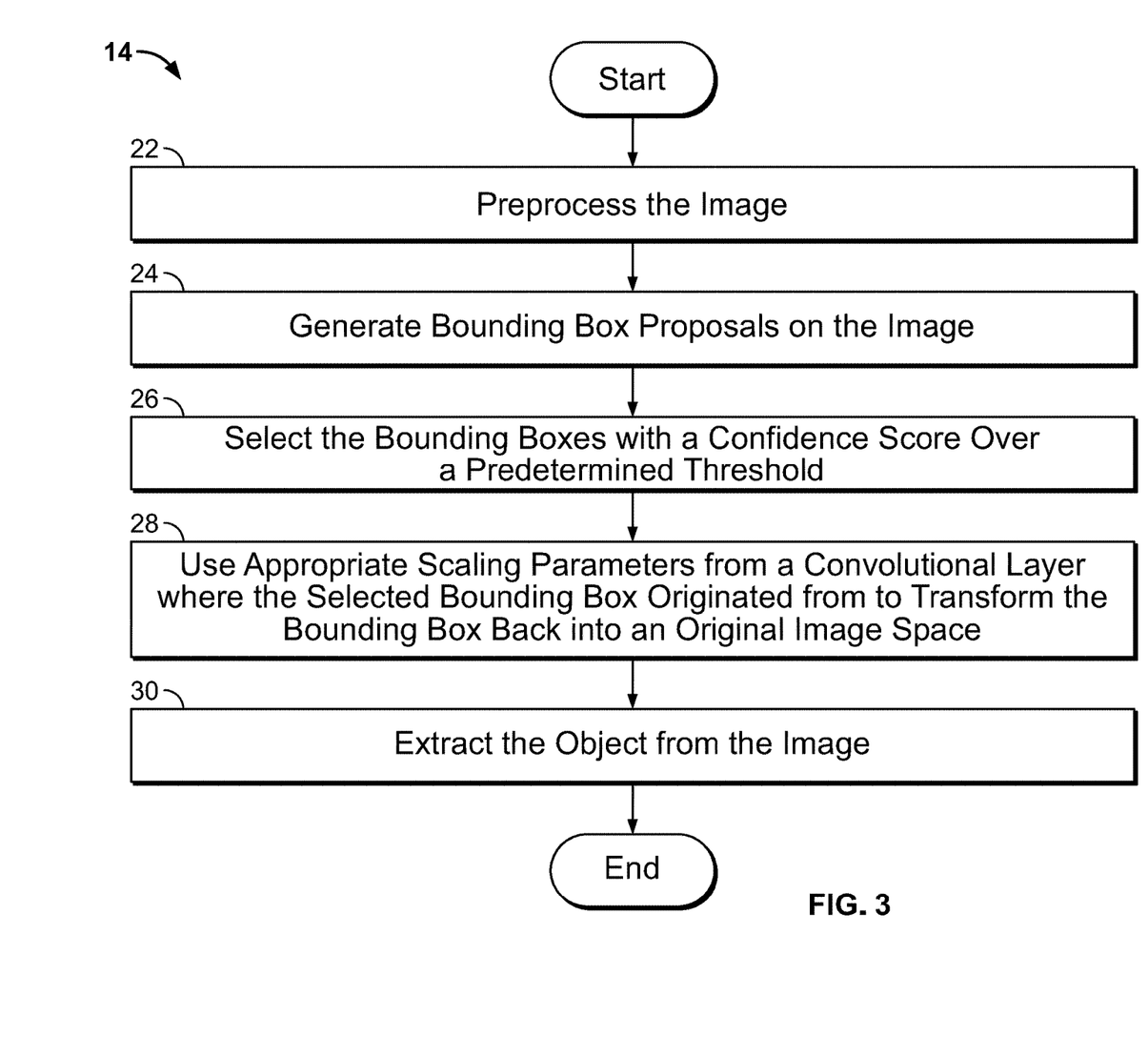
FIG. 3 is a flowchart illustrating step 14 of FIG. 1 in greater detail.

FIG. 3 is a flowchart illustrating steps 14 and 16 of FIG. 1 in greater detail. In particular, FIG. 3 illustrates process steps performed during the detection and high-level classification phase and during the object extraction phase. It should first be noted that during the detection and high-level classification phase, the system can use a CNN to detect one or more objects (e.g., chairs, desks, radios, etc.). For example, a feature extractor of the SSD network can be used. The feature extractor can be implemented as a fully convolutional neural network, such as a ResNet-100 or VGG16, where additional convolutional layers can be learned while the SSD network is trained. However, prior to the system using the feature extractor, the image may need to be preprocessed, depending on the feature extractor to be used.

In step 22, the system preprocesses the image to generate a preprocessed image. In an example, a normalization process or a channel value centering process can be performed on the image to prepare the image for the feature extractor. For example, the VGG16 network can perform channel centering by subtracting, from the image, mean RGB values from training images. Such preprocessing can increase the speed and/or accuracy of object detection and classification performed by the system. As discussed above, different feature extractors can require different image preprocessing. However, it should be understood that some feature extractors may not require any image preprocessing and, therefore, the detection and high-level classification phase can begin at step 24.

Figure 4A:
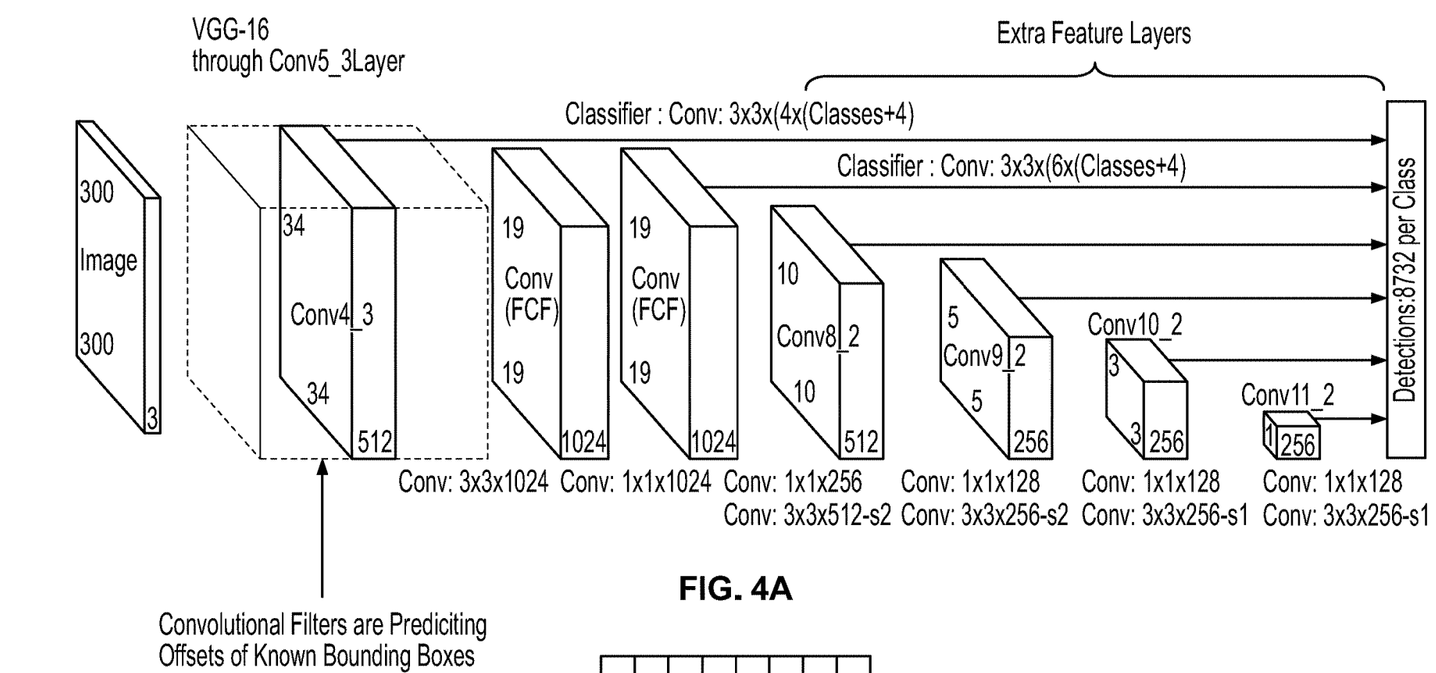
FIGS. 4A-4B are diagrams illustrating a process for predicting offset bounding boxes.
Figure 4B:
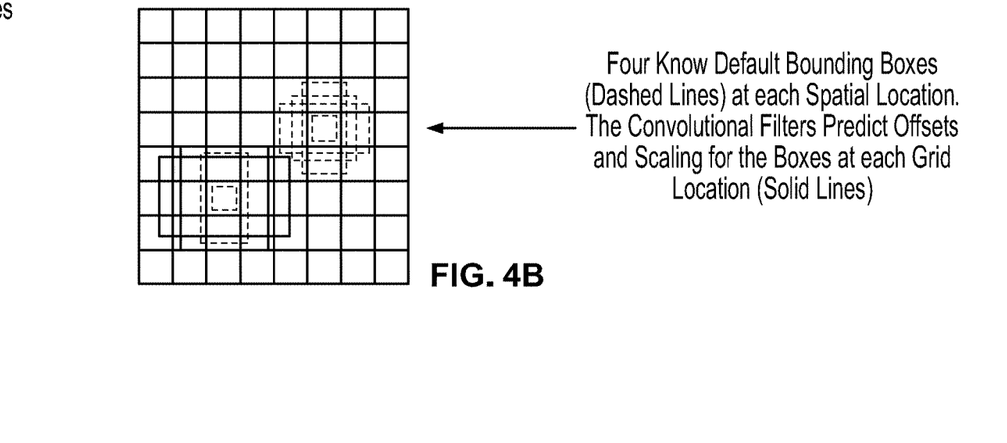

In step 24, the system generates bounding box proposals on the preprocessed image (or image if there is no need for the image to be preprocessed). Specifically, the system runs the image through a feature extractor. In an example, using the SSD network, the feature extractor generates feature maps at various scales. The feature maps at the various scales correspond to different amounts of down sampling of the image. Next, a bounding box localization process runs over the various scales. At each scale, one or more bounding boxes and a class are proposed. The bounding boxes and the class are assigned a level of confidence. The bounding boxes can be proposed as offsets from a set of known bounding boxes called "default boxes". For example, as illustrated in FIG. 4A, at the "Cony 4" layer, a set of four default boxes are encoded with an x,y location (a height and a width). The default boxes are then tilted across an entire input to form a grid, which is illustrated in FIG. 4B. Next, a convolutional filter is learned. The convolutional filter estimates a respective x, y height and width offsets that best match ground truth boxes. This process can be used to generate similar bounding boxes at subsequent downscaled layers, which allows the SSD network to predict various sized bounding boxes in the image. The filters can produce many (e.g., hundreds, thousands, etc.) of proposed bounding boxes with classifications.

Figure 5:
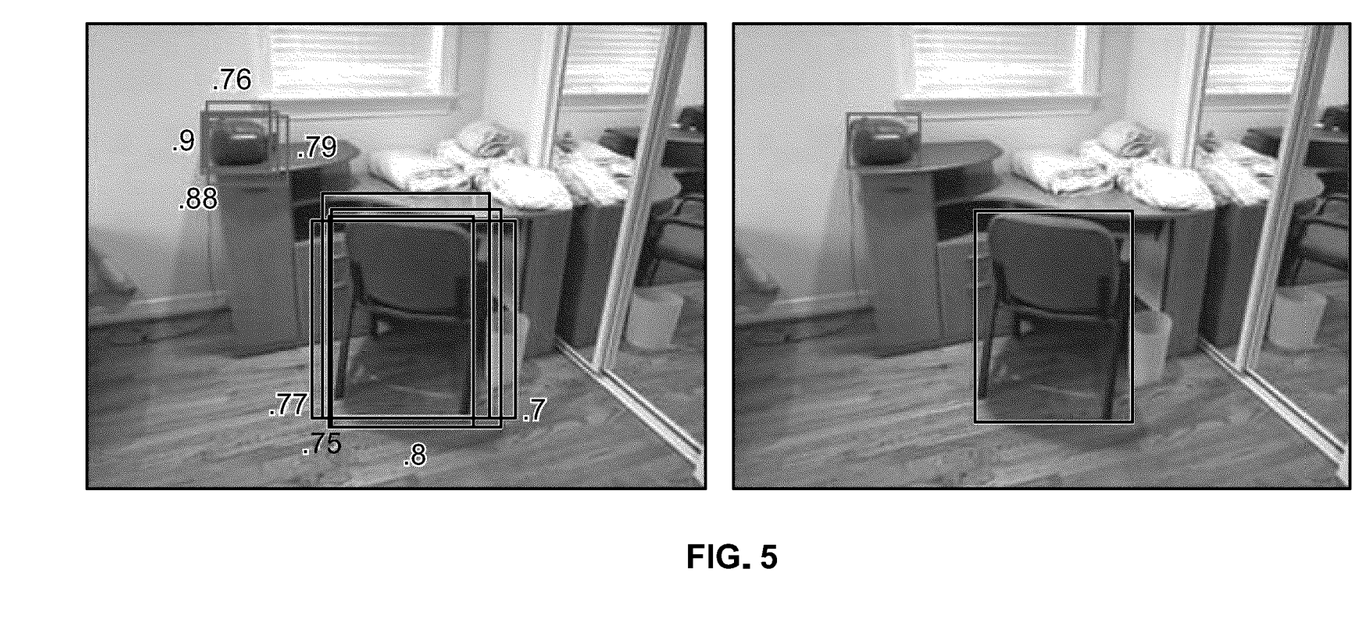
FIG. 5 is a diagram illustrating a process for selecting a bounding box from several overlapping bounding boxes via the non-maximal suppression method.

In step 26, the system selects the bounding boxes with a confidence score over a predetermined threshold. As discussed above, each of the bounding boxes (e.g., a proposed detection of an object) has a confidence level. The system will keep the bounding boxes that have a confidence score above a predetermined threshold value. For example, bounding boxes with a confidence score of 0.7 or higher are kept and bounding boxes with a confidence score below 0.7 can be discarded. In an example, several overlapping bounding boxes can remain. For example, multiple convolution filters can pick offsets for their corresponding default box and produce roughly a same proposed object detection. In such an example, a non-maximal suppression method can be used to select a single proposed detection (e.g., a single bounding box). In an example, an algorithm is used to select the bounding box with the highest confidence score in a neighborhood of each bounding box. The size of the neighborhood is a parameter of the algorithm and can be set, for example, to a fifty percent overlap. FIG. 5 illustrates selection by the system of a bounding box from several overlapping bounding boxes via the non-maximal suppression method.

Figure 6:
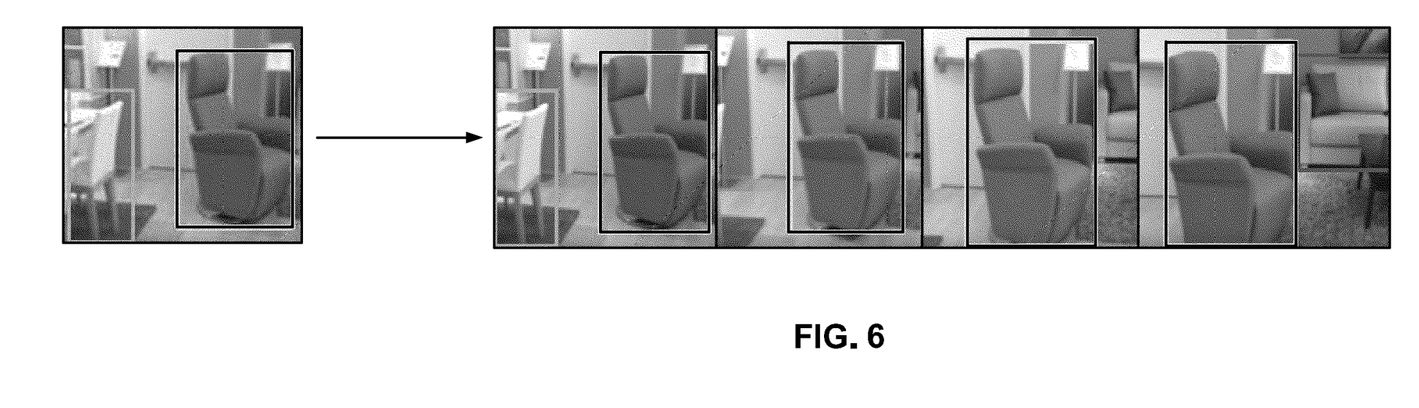
FIG. 6 is a diagram illustrating a newly detected object being discovered in a video stream.

In step 28, the system uses appropriate scaling parameters from a convolutional layer where a selected bounding box originated to transform the bounding box back into an original image space. In step 30, an object bound by the bounding box is extracted from the image during the object extraction phase. It should be understood that this process can be performed for each object found in each image or video frame. Each object extracted can be referred to as a "proposed line item". In a first example, where the object is in a single image, the system extracts the object by cropping out the bounding box. In a second example, where the object is in a video input, the object can appear over multiple video frames. In such a case, the system can track the object to ensure that the object only appears as a single proposed line item. A tracking algorithm, such as Multiple Instance Learning ("MIL") or Kernelized Correlation Filters ("KCF") can be used to track the object across the multiple frames. Using a first frame of video, the bounding boxes determined in the object detection and high-level classification phase are used to seed the tracking algorithm with a one or more initial bounding boxes. The algorithm then tracks the object(s) with an internal representation of the object(s) being tracked. The internal representations are updated over time by the algorithm. After every n number of frames, if a new object is detected, the system can execute the object detection and high-level classification phase again to reinitialize the tracker with a newly detected object. FIG. 6 is a diagram illustrating a newly detected object being discovered in a video stream.

Figure 7:
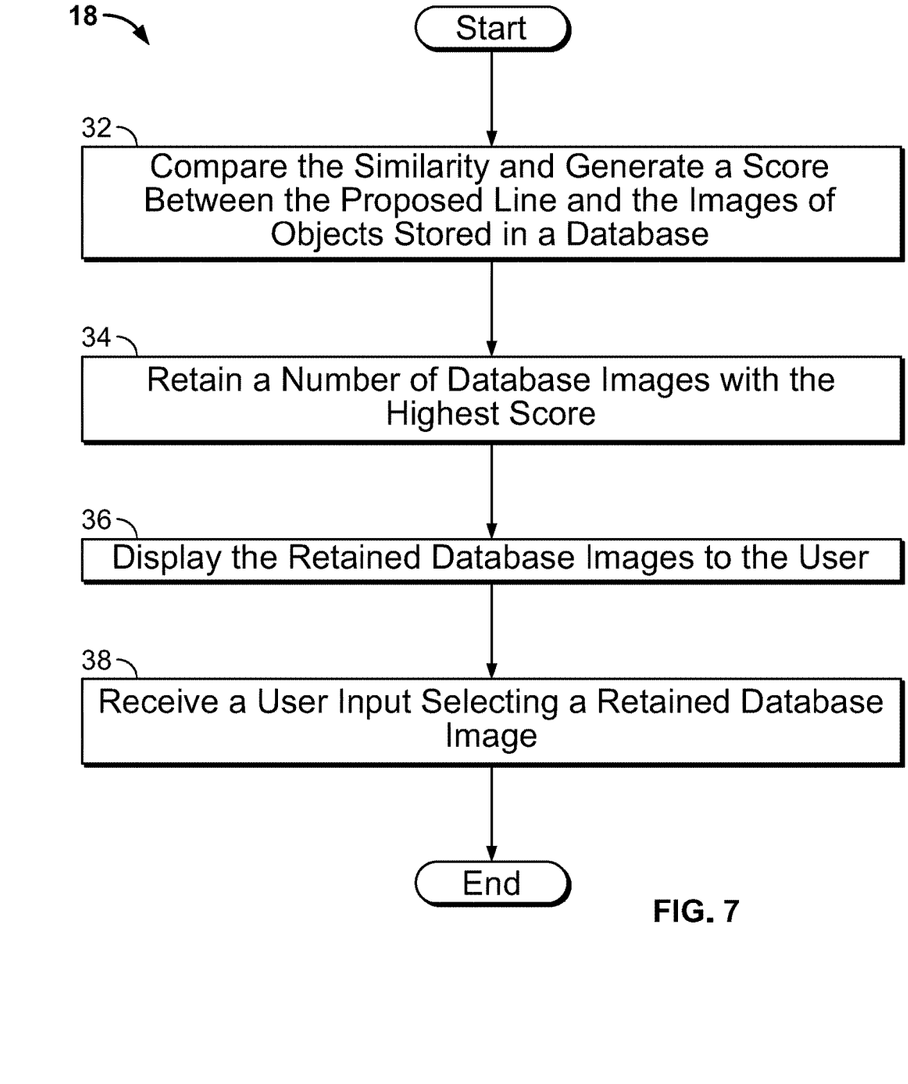
FIG. 7 is a flowchart illustrating steps 16 and 18 of FIG. 1 in greater detail.
Figure 8:
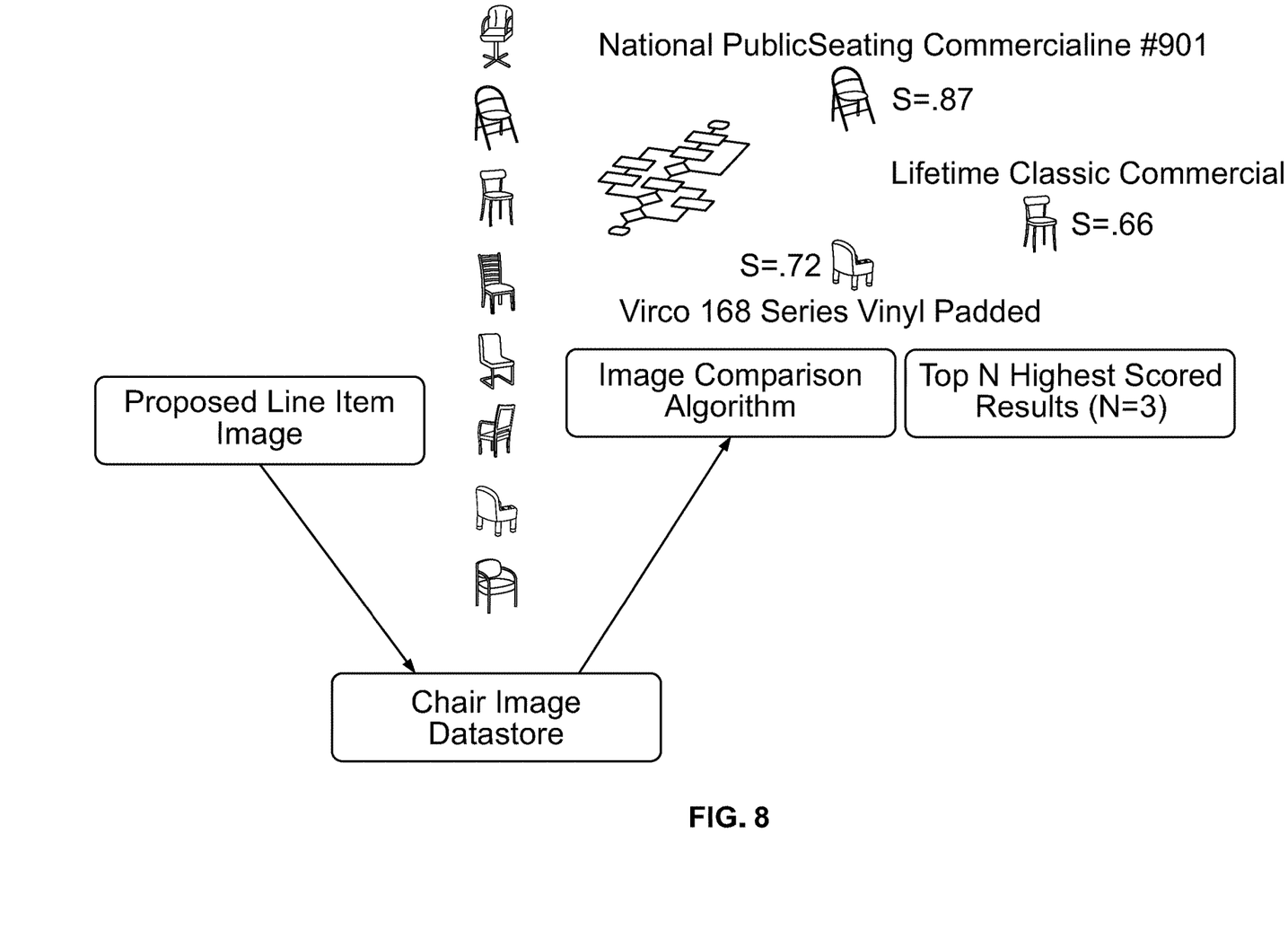
FIG. 8 is a diagram illustrating the process for specific classification.

FIG. 7 is a flowchart illustrating step 18 of FIG. 1 in greater detail. In particular, FIG. 7 illustrates process steps performed during the specific classification phase. In step 32, the system compares a similarity and generates a score between the proposed line item and images of objects stored in a database. Each image of an object stored in the database can have an assigned make, model, price, etc. In an example, a key point matching algorithm is used to generate the score. The algorithm first creates several key point descriptors at relevant locations on the proposed line item image and on a database image. The descriptors can be scale-invariant feature transform ("SIFT") descriptors, histogram of oriented gradients ("HoG") descriptors, or KAZE descriptors. The system then compares the descriptors on the proposed line item image and on the database image to identify matching points. The database images can be rotates, skewed, contrast adjusted, etc. to account for variations in the proposed line item image. Each database image can be assigned a similarity score. FIG. 8 is a diagram illustrating the process for specific classification.

Figure 9:
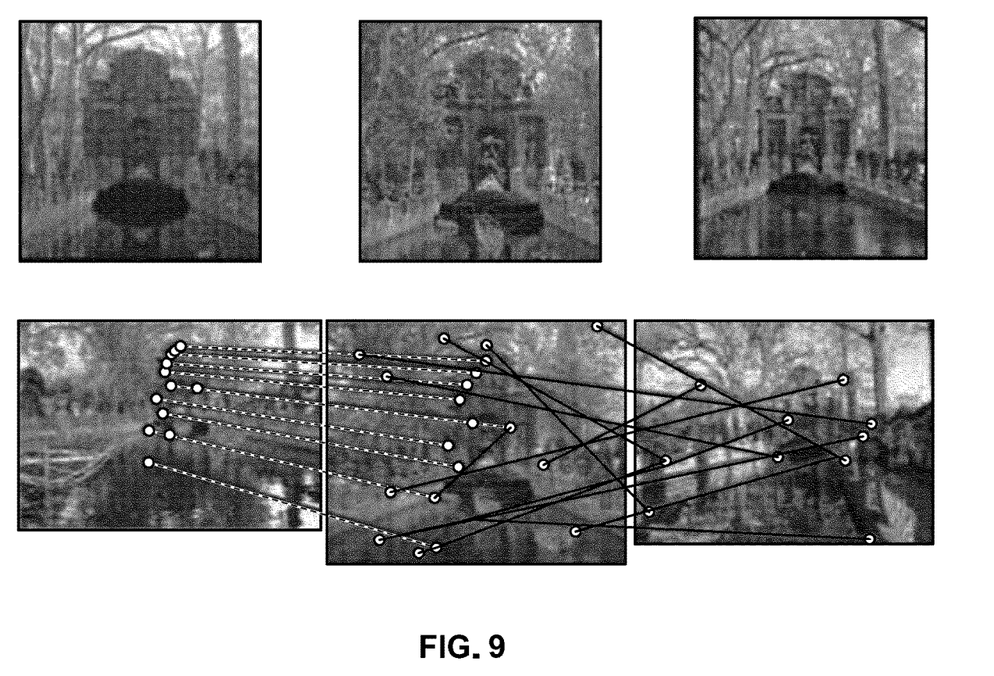
FIG. 9 is a diagram illustrating an example of SIFT matching versus locally weighted key point matching.

It should be noted that the key point descriptors excel at detecting similarities at a raw pixel level, but struggle when there are several local changes. To match the proposed line item image and the database images at a broader scale, e.g., object matching instead of pixel matching, other approaches can be used. For example, rather than weighing each key point descriptor uniformly when calculating a final similarity score, local changes are considered by determining a uniqueness of each key point descriptor. The system then weighs the key point descriptors and assigns a similarity score. FIG. 9 is a diagram illustrating an example of SIFT matching versus locally weighted key point matching.

In step 34, the system retains a number of database images with the highest similarity scores. The number can be a predefined amount or a user selected amount. In step 36, the system displays the retained database images to the user for a selection. In step 38, the user selects an image from the retained database images. In an example, the system can select a retained database image with the highest similarity score rather than use a user input. In a further example, when the similarity scores for a proposed line item fall below a threshold value, the object can be considered as unlabeled. In such an example, a manual pricing can be performed. It should be understood that this process can be performed for every proposed line item to select a comparable object.

Figure 10:
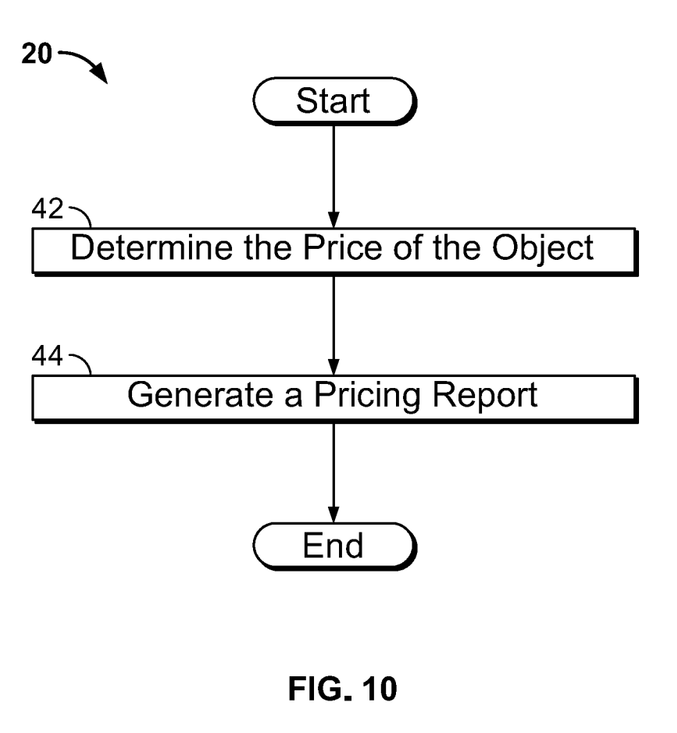
FIG. 10 is a flowchart illustrating step 20 of FIG. 1 in greater detail.

FIG. 10 is a flowchart illustrating step 20 of FIG. 1 in greater detail. In particular, FIG. 10 illustrates process steps performed during the pricing lookup and report generation phase. In step 42, the system determines the price of the comparable object. In an example, the system can determine the price of the object via a database. The database can consist of multiple entries for the object. The multiple entries can be from different retailers, different wholesales, etc. In another example, the system can determine the price of the object via the internet. In the case of multiple entries, the user can have the option to select a price given a list of options, select to use prices from a single retailer, etc.

Figure 11:
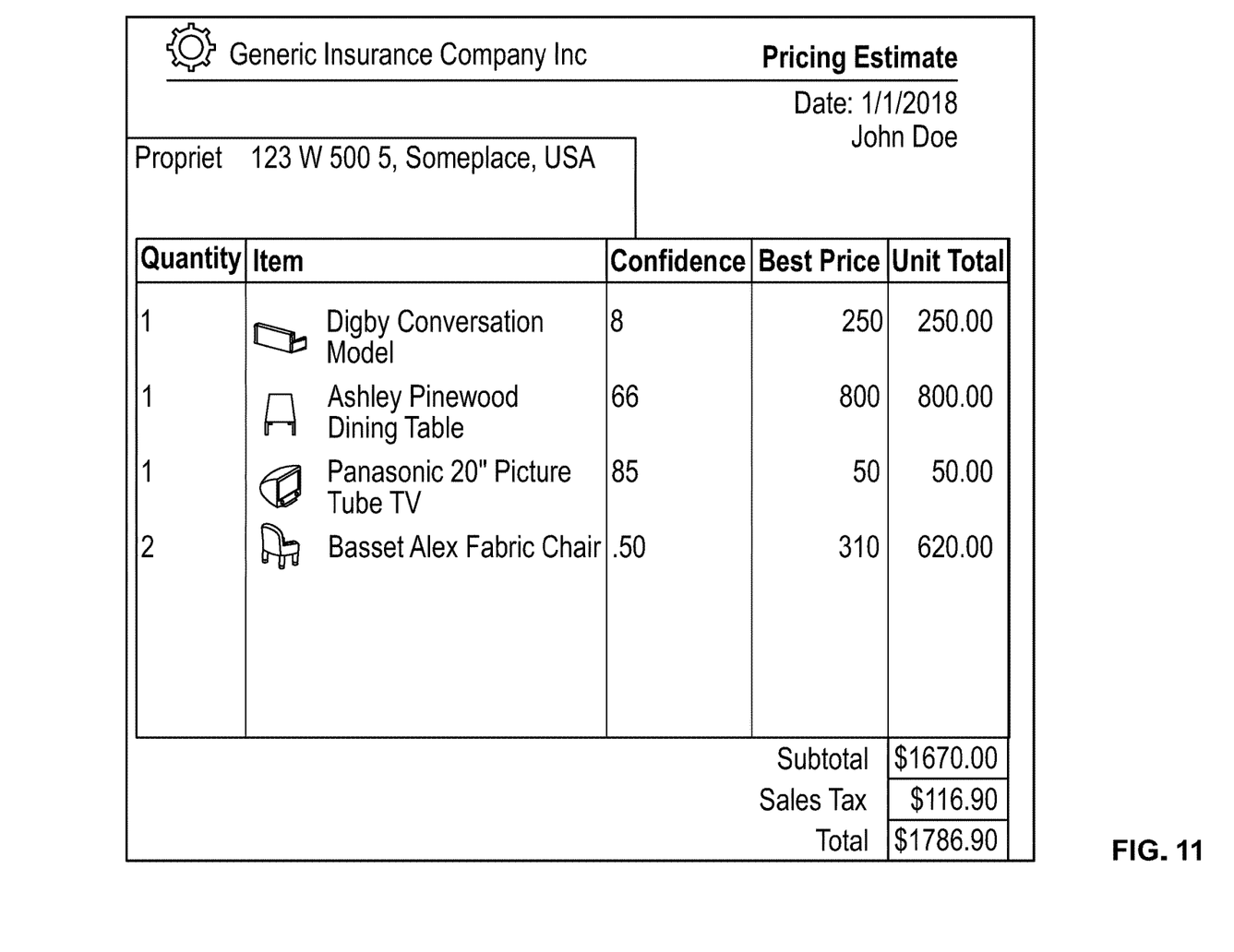
FIG. 11 is a photo showing an example of a pricing report capable of being generated by the system.

In step 44, the system generates a pricing report. The pricing report can include a view of one or more of each line item identified, each comparable object, the estimate price, the source of the pricing data, a quantity, etc. The pricing report can further include the confidence scores, the similarity scores, etc. The report can be interactive to allow the user to add or remove line items, change a quantity, add notes, etc. FIG. 11 is a photo showing an example of a pricing report.

Figure 12:
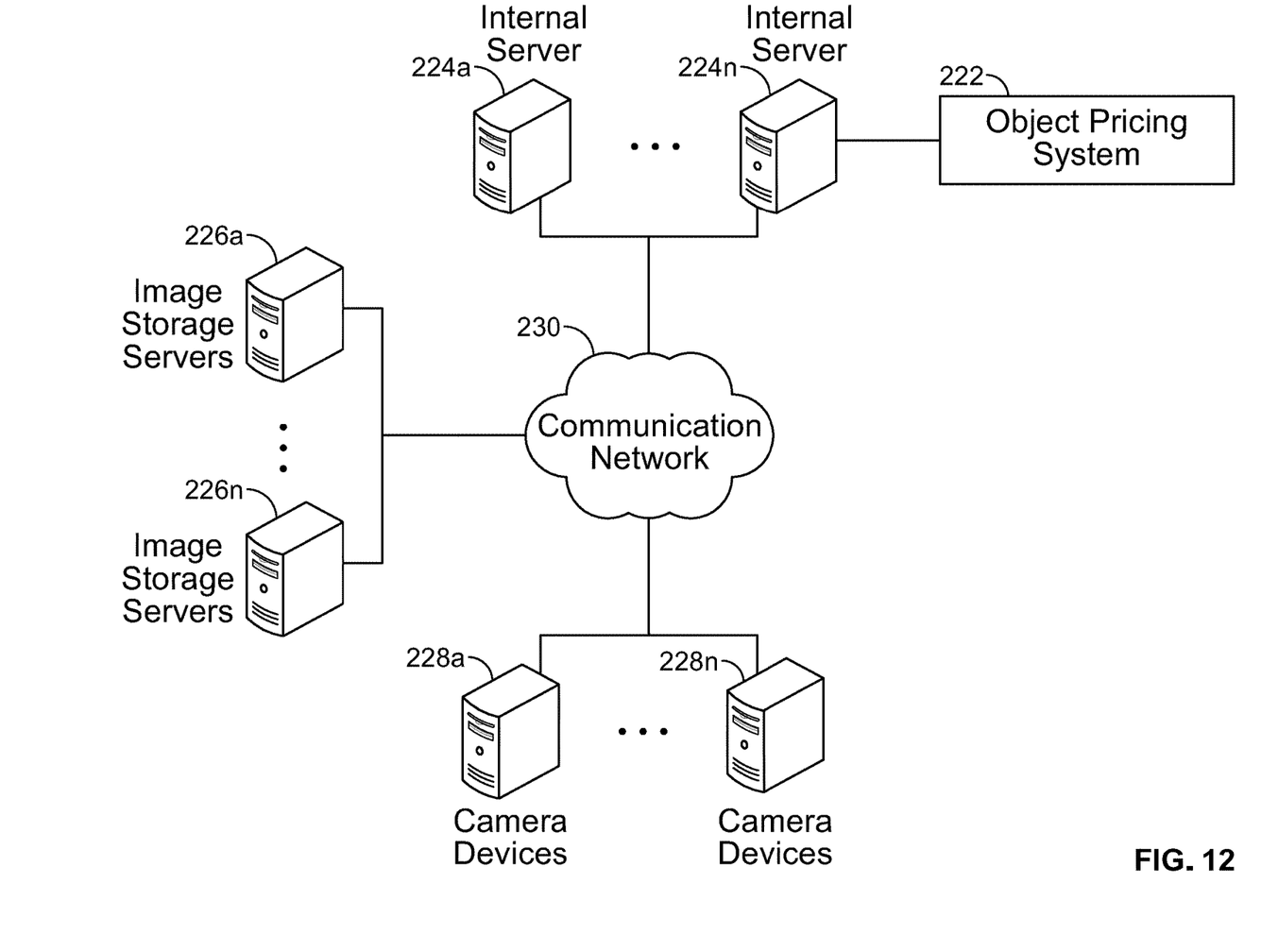
FIG. 12 is a diagram illustrating sample hardware components on which the system of the present disclosure could be implemented.

FIG. 12 is a diagram illustrating computer hardware and network components on which the system of the present disclosure could be implemented. The system can include a plurality of internal servers 224a-224n having at least one processor and memory for executing the computer instructions and methods described above (which could be embodied as computer software 222 illustrated in the diagram). The system can also include a plurality of image storage servers 226a-226n for receiving the image data and video data. The system can also include a plurality of camera devices 228a-228n for capturing image data and video data. These systems can communicate over a communication network 230. The object pricing system or engine can be stored on the internal servers 224a-224n or on an external server(s). Of course, the system of the present disclosure need not be implemented on multiple devices, and indeed, the system could be implemented on a single computer system (e.g., a personal computer, server, mobile computer, smart phone, etc.) without departing from the spirit or scope of the present disclosure.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure. What is intended to be protected by Letter Patent is set forth in the following claims.

What is claimed is:

1. A system for automatically detecting, classifying, and processing objects captured in an image, comprising:
a processor in communication with an image source; and
computer system code executed by the processor, the computer system code causing the processor to:
receive an image from the image source;
detect one or more objects in the image;
perform a high-level classification of each of the one or more objects in the image by labeling each of the one or more objects in the image;
extract each of the one or more objects from the image;
perform a specific classification of each of the one or more objects by; identifying at least one stored image from a database of stored images that includes at least one attribute in common with the one or more objects;
determine at least one of a make, a model, or a price of each of the one or more objects based by retrieving a stored make, model, or price associated with the at least one stored image identified from the database of stored images; and generate a report comprising the at least one make, model, or price of each of the one or more objects.

2. The system of claim 1, wherein the image comprises a photograph or a video frame.

3. The system of claim 1, wherein the processor performs the steps of detecting the at least one object in the image and performing the high-level classification of the at least one object in the image using a convolutional neural network ("CNN").

4. The system of claim 3, wherein the CNN generates one or more bounding boxes on the image.

5. The system of claim 4, wherein each of the one or more bounding boxes are assigned a confidence score.

6. The system of claim 5, wherein the system retains each of the one or more bounding boxes with a confidence score higher than a predetermined threshold and discards each of the one or more bounding boxes with a confidence score lower than the predetermined threshold.

7. The system of claim 6, wherein the system selects a single bounding box when there are more than one bounding boxes, using a non-maximal suppression method.

8. The system of claim 4, wherein the system transforms the one or more bounding boxes into an original image space using scaling parameters.

9. The system of claim 4, wherein the processor performs the step of extracting the at least object from the image by cropping out the one or more bounding boxes.

10. The system of claim 1, wherein the system tracks each of the one or more objects in further images using a tracking algorithm.

11. The system of claim 10, wherein the tracking algorithm comprises a Multiple Instance Learning algorithm or a Kernelized Correlation Filters algorithm.

12. The system of claim 10, wherein when a new object is detected in the further images, the system performs a high-level classification of the new object.

13. The system of claim 1, wherein step of performing the specific classification comprises generating a score between the object and each of the stored images.

14. The system of claim 13, wherein the system generates the score using a key point matching algorithm.

15. The system of claim 14, wherein the key point matching algorithm generates key point descriptors at locations on the object and at locations on each of the stored images and compares the descriptors to identify matching points.

16. The system of claim 15, wherein the descriptors comprise at least one of scale-invariant feature transform ("SIFT") descriptors, histogram of oriented gradients ("HoG") descriptors, or KAZE descriptors.

17. The system of claim 1, wherein, prior to the step of detecting the at least one object in the image, the system preprocesses the image using a normalization process or a channel value centering process.

18. A method for automatically detecting, classifying, and processing objects captured in an image, comprising steps of:

receiving an image;
detecting one or more objects in the image;
performing a high-level classification of each of the one or more objects in the image by labeling each of the one or more objects in the image;
extracting each of the one or more objects from the image;
performing a specific classification of each of the one or more objects by; identifying at least one stored image from a database of stored images that includes at least one attribute in common with the one or more objects;
determining at least one of a make, a model, or a price of each of the one or more objects based by retrieving a stored make, model, or price associated with the at least one stored image identified from the database of stored images; and
generating a report comprising the at least one make, model, or price of each of the one or more objects.

19. The method of claim 18, wherein the image comprises a photograph or a video frame.

20. The method of claim 18, wherein the steps of detecting the at least one object in the image and performing the high-level classification of the at least one object in the image are performed using a convolutional neural network ("CNN").

21. The method of claim 20, wherein the CNN generates one or more bounding boxes on the image.

22. The method of claim 21, wherein each of the one or more bounding boxes are assigned a confidence score.

23. The method of claim 22, further comprising retaining each of the one or more bounding boxes with a confidence score higher than a predetermined threshold and discarding each of the one or more bounding boxes with a confidence score lower than the predetermined threshold.

24. The method of claim 23, further comprising selecting a single bounding box when there are more than one bounding boxes, using a non-maximal suppression method.

25. The method of claim 21, further comprising transforming the one or more bounding boxes into an original image space using scaling parameters.

26. The method of claim 21, further comprising performing step of extracting the at least object from the image by cropping out the one or more bounding boxes.

27. The method of claim 18, further comprising tracking each of the one or more objects in further images using a tracking algorithm.

28. The method of claim 27, wherein the tracking algorithm comprises a Multiple Instance Learning algorithm or a Kernelized Correlation Filters algorithm.

29. The method of claim 27, further comprising performing a high-level classification of a new object when the new object is detected in the further images.

30. The method of claim 18, wherein the step of performing the specific classification comprises generating a score between the object and each of the stored images.

31. The method of claim 30, further comprising generating the score with a key point matching algorithm.

32. The method of claim 31, wherein the key point matching algorithm generates key point descriptors at locations on the object and at locations on each of the stored images and compares the descriptors to identify matching points.

33. The method of claim 32, wherein the descriptors comprise at least one of scale-invariant feature transform ("SIFT") descriptors, histogram of oriented gradients ("HoG") descriptors, or KAZE descriptors.

34. The method of claim 18, further comprising, prior to the step of detecting the at least one object in the image, preprocessing the image using a normalization process or a channel value centering process.

* * * * *